(12) United States Patent
Ott et al.

(10) Patent No.: US 6,212,783 B1
(45) Date of Patent: Apr. 10, 2001

(54) NON-CONTACT SYSTEM FOR DETECTING AN ANGLE OF ROTATION

(75) Inventors: Karl Ott, Markgroeningen; Michael Lehner, Muehlacker, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/214,249

(22) PCT Filed: May 23, 1998

(86) PCT No.: PCT/DE98/01399

§ 371 Date: Dec. 31, 1998

§ 102(e) Date: Dec. 31, 1998

(87) PCT Pub. No.: WO98/54541

PCT Pub. Date: Dec. 3, 1998

(30) Foreign Application Priority Data

May 27, 1997 (DE) .............................................. 197 22 016

(51) Int. Cl.[7] ....................................................... G01B 7/24
(52) U.S. Cl. ......................................... 33/1 PT; 324/207.2
(58) Field of Search ....................... 33/1 PT; 324/207.25, 324/207.2, 207.4; 338/32 H, 32 R

(56) References Cited

U.S. PATENT DOCUMENTS

| Re. 28,904 | * | 7/1976 | Maisonville | 324/16 R |
|---|---|---|---|---|
| 3,753,108 | * | 8/1973 | Eberle | 324/16 R |
| 3,763,420 | * | 10/1973 | Maisonville | 324/16 R |
| 3,889,528 | * | 6/1975 | Grikscheit et al. | 73/119 R |
| 4,486,845 | * | 12/1984 | Duckworth | 33/1 PT |
| 4,529,977 | * | 7/1985 | Kornus et al. | 340/686 |
| 4,810,967 | * | 3/1989 | Yokoyama et al. | 324/208 |

(List continued on next page.)

FOREIGN PATENT DOCUMENTS

| 197803 | * | 3/1978 | (DE) . | |
|---|---|---|---|---|
| 3326307 | * | 1/1985 | (DE) | 33/1 PT |
| 4115244A1 | * | 10/1987 | (DE) | 33/1 PT |
| 004012179 | * | 10/1991 | (DE) | 33/1 PT |
| 4408623 | * | 9/1994 | (DE) . | |
| 195 43 562 | | 11/1995 | (DE) . | |
| 000466228 | * | 1/1992 | (EP) | 33/1 PT |
| 656526 | * | 6/1995 | (EP) . | |
| 000726448A1 | * | 8/1996 | (EP) . | |
| 62-235820 | * | 10/1987 | (JP) | 33/1 PT |

*Primary Examiner*—G. Bradley Bennett
*Assistant Examiner*—Gail Verbitsky
(74) *Attorney, Agent, or Firm*—Michael J. Striker

(57) ABSTRACT

The arrangement for contactless determination of an angular position of a rotatable element, such as a camshaft of an internal combustion engine, which includes a magnet arranged to rotate with the rotatable element; a magnetic field sensor stationary in relation to the rotatable element and including a first sensor element (IC1) and a second sensor element (IC2), wherein the first sensor element generates a first output signal linearly dependent on an angle between the magnetic field and the magnetic field sensor according to a magnetoresistive effect, whereby the first output signal has respective values between 0° and 180° that repeat between 180° and 360°, and the second sensor element generates a second output signal having a high value between 0° and 180° and a low value between 180° and 360° according to a Hall effect; and an evaluation circuit (A) for analyzing output signals of both sensor elements to determine the angular position of the rotatable element between 0° and 360°. The evaluating circuit finds that the absolute angular position is either of two angular orientations spaced 180° from each other only from the signal from the first sensor element and selects one of them as the absolute angular position according to the second output signal.

7 Claims, 2 Drawing Sheets

U.S. PATENT DOCUMENTS

| | | | | |
|---|---|---|---|---|
| 4,897,914 | * | 2/1990 | Loubier | 29/602.1 |
| 5,019,776 | * | 5/1991 | Kawamata et al. | 324/207.12 |
| 5,444,370 | * | 8/1995 | Wu | 324/207.2 |
| 5,477,143 | * | 12/1995 | Wu | 324/207.21 |
| 5,497,082 | * | 3/1996 | Hancock | 324/207.14 |
| 5,570,016 | * | 10/1996 | Schroeder et al. | 324/207.25 |
| 5,657,544 | * | 8/1997 | Ota et al. | 33/1 N |
| 5,668,331 | * | 9/1997 | Schintag et al. | 73/865.9 |
| 5,694,040 | * | 12/1997 | Plagens | 324/207.2 |
| 5,813,124 | * | 3/1999 | Freitag | 33/1 PT |
| 5,861,747 | * | 1/1999 | Kubinski | 324/207.21 |
| 5,880,586 | * | 3/1999 | Dukart et al. | 324/207.2 |
| 5,887,351 | * | 3/1999 | Arms et al. | 33/1 PT |
| 5,930,905 | * | 8/1999 | Zabler et al. | 33/1 PT |
| 6,064,197 | * | 5/2000 | Lochmann et al. | 324/207.14 |

* cited by examiner

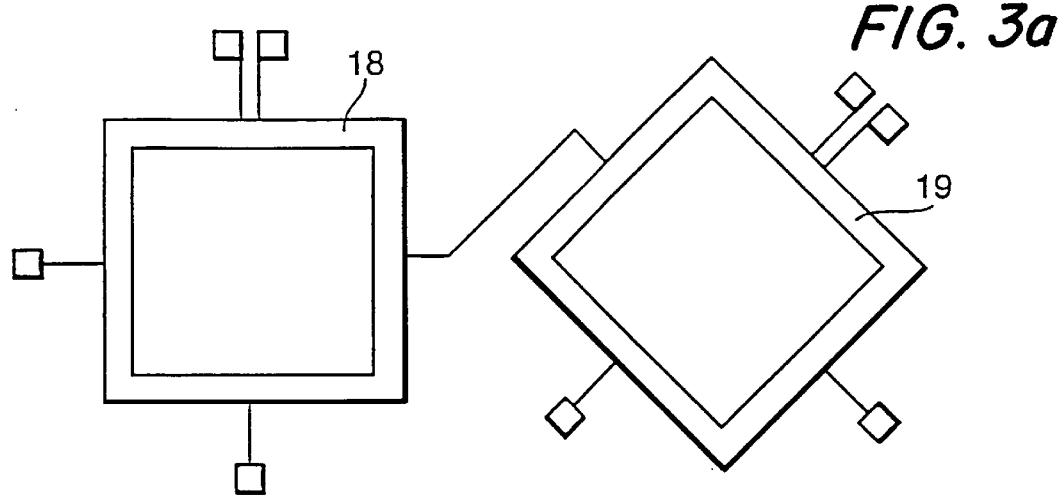
FIG. 3a
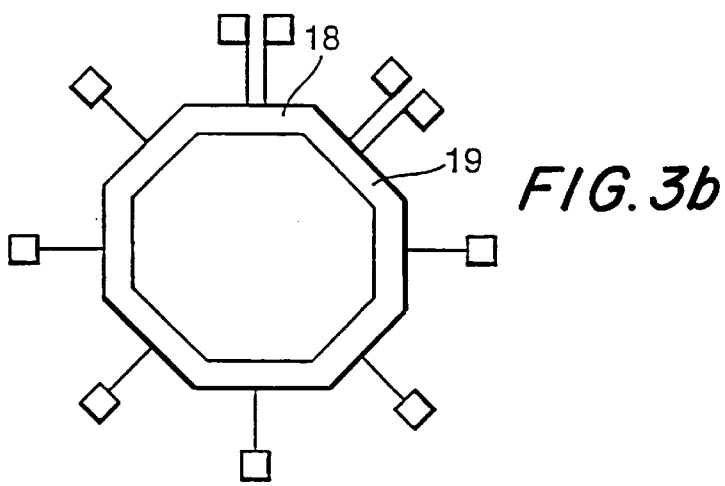
FIG. 3b
FIG. 4
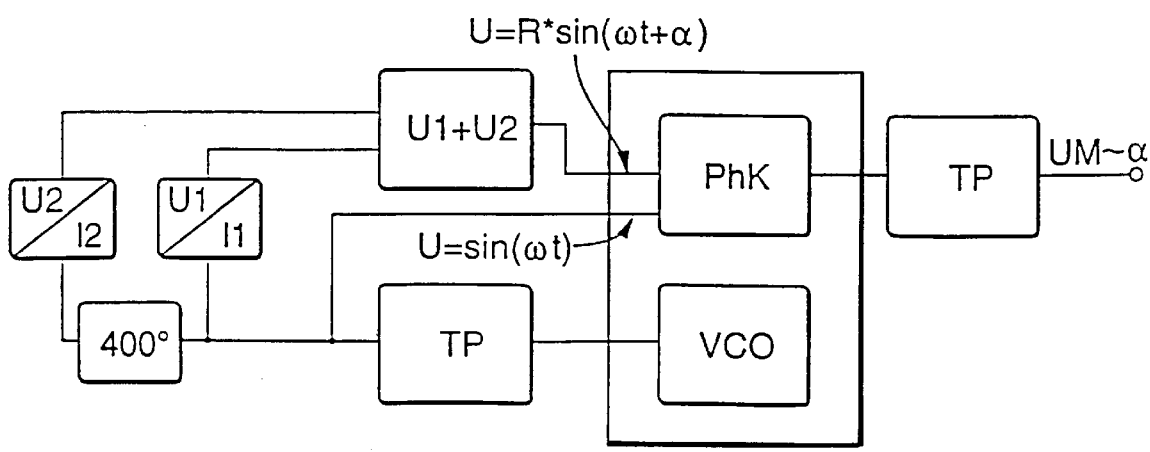

NON-CONTACT SYSTEM FOR DETECTING AN ANGLE OF ROTATION

BACKGROUND OF THE INVENTION

1. Field of the Invention

The invention relates to an arrangement for the contactless determination of an angle of rotation of a rotatable element, in particular a shaft of an internal combustion engine, in which, comprising means for generating a magnetic field rotating with the rotatable element, a magnetic field sensor for detection of magnetic field intensity and an evaluation circuit for determining the angular orientation or position of the rotatable element from the magnetic field sensor output signals.

2. Prior Art

Arrangements of this kind, with which a determination of an angle of rotation can be performed, are known for instance from Published, Non-Examined German Patent Application DE-OS 195 43 562. In these arrangements, a magnet is connected to the rotatable shaft whose angular position is to be ascertained. The magnetic field, which varies with the angle of rotation of the shaft, is measured with the aid of two sensor elements. These sensor elements are either two Hall sensor elements, which are rotatable by an angle of 90° from one another, or two magnetoresistive sensor elements, which are rotated by 45° from one another. The sensor elements are supplied with alternating voltage signals phase offset from one another in a suitable way. The superposition of the output signals of the sensor elements produces a signal course which is representative for the angular position. By suitable linkage of the signals of the two sensor elements, an angle measurement over an angular range of 360° can be obtained. One special application of the known arrangements for contactless determination of an angle of rotation is to detect the angular position of the camshaft of an internal combustion engine. The arrangements described in DE-OS 195 43 562 for contactless determination of an angle of rotation each have two identical sensor elements. This could have disadvantages, because Hall sensors, for instance, have great temperature dependency and great pressure dependency. Magnetoresistive sensor elements, conversely, have better properties with regard to temperature and pressure dependency, being less temperature- and pressure-dependent than Hall sensors, but have the disadvantage that because of the physical effect, only an angular range of 180° can be detected unambiguously. Such an angular range is too small for detecting the position of the camshaft of an internal combustion engine.

Since with the present invention the angle of rotation of the camshaft of an internal combustion engine is intended in particular to be detected, the problems involved in detecting the camshaft angle will first be described below.

To meet the demands for functionality of modern engine controllers, the rpm and the angular position of the crankshaft and camshaft must be detected with high precision at all times. For rpm detection at the crankshaft, a transducer disk with 60-2 angle markings is used, which rotates with the crankshaft and is scanned by a sensor; as the sensor, a sensor that utilizes the inductive, magnetoresistive, or Hall effect is employed.

So that sufficient information about the current operating play of the engine can be obtained, the absolute camshaft position (NW position) must additionally be ascertained. In present engine control systems, the camshaft positions are detected segmentally. A disk that rotates with the camshaft and has one angle marking per cylinder, for instance, is scanned with the aid of a sensor. This sensor outputs an output signal which has one pulse multiple times per camshaft revolution; as a result, current accurate-angle information about the camshaft position is always obtained at the segment boundaries, that is, at the points where pulses occur in the camshaft sensor signal. At the angular positions between segment boundaries, accurate absolute angle information on the camshaft position is unavailable.

SUMMARY OF THE INVENTION

It is an object of the present invention to provide an arrangement for contactless determination of an angular position of a rotatable element that does not have the above-described disadvantages.

It is also an object of the present invention to provide an arrangement for continuous contactless determination of the angular position of a camshaft of an internal combustion engine that is less sensitive to changes in temperature and pressure but nevertheless provides an unambiguous determination of angular position between 0° and 360°.

According to the invention the arrangement for contactless determination of an angular position of a rotatable element, especially a camshaft of an internal combustion engine, comprises means for generating a magnetic field comprising at least one magnetic field-producing element arranged to rotate with the rotatable element;

a magnetic field sensor stationary in relation to the rotatable element and including a first sensor element and a second sensor element, wherein the first sensor element operates according to a magnetoresistive effect so as to generate a first output signal linearly dependent on an angle between the magnetic field and the magnetic field sensor, whereby the first output signal has respective values between 0° and 180° that repeat between 180° and 360°, the second sensor element operates according to a Hall effect to generate a second output signal which has a high value between 0° and 180° and a low value between 180° and 360°; and an evaluation circuit comprising means for analyzing the output signals of both sensor elements to determine the angular position of the rotatable element between 0° and 360°.

In preferred embodiments of the arrangement according to the invention sensor elements are mounted so that magnetic field lines from the magnet are oriented approximately parallel to the first sensor element and perpendicularly penetrate the second sensor element.

In a preferred embodiment of the arrangement according to the invention the evaluating circuit finds that the absolute angular position is either of two angular orientations spaced 180° from each other only from the signals from the first sensor element and then selects one of them as the absolute angular position using the second output signal.

With continuous determination of an angle of rotation at the camshaft by means of the arrangement for contactless determination of angular position according to the invention, an improvement in the engine control system can be attained, since the current angle information is available at all times in the control unit. The functionality of existing engine control functions can thus be improved, and additional functions can optionally be achieved. For instance, with such continuous determination of an angle of rotation at the camshaft, fast diagnosis of the rpm transducer can be performed; simple, rapid diagnosis of the absolute angle encoder itself is possible by monitoring the plausibility of the signal. Safe and simple detections of starting can also be performed. Both engine stalling and underspeed can be reliably detected; it is possible to detect the direction of rotation, and faster synchronization in fast-start operations can be achieved.

Better emergency operation of an rpm transistor can also be achieved, and direct starting of the engine is possible only using an absolute angle encoder. Such an absolute angle encoder, with which the angular position of the camshaft can be ascertained at any time, can be achieved with the aid of the present invention. By using the sensor of the invention as a camshaft sensor, an engine control system can thus be constructed which is distinguished by a better fast start, so that the battery, starter and generator are not so severely burdened and can therefore be made smaller. Reliable detection of the rotational direction makes it possible to prevent intake tube splatting, and as a result the intake tube and throttle valve of the engine can for instance be made to less stringent specifications.

With the arrangement for contactless determination of an angle of rotation according to the invention, an angle determination can advantageously be performed that has little temperature dependency and little pressure dependency yet at the same time allows good resolution. It is advantageously possible to measure over an angle of 360°, so that an especially advantageous use in absolute angle measurement of the camshaft of an internal combustion engine is also possible.

These advantages are attained in that the angle sensor utilizes a combination of the Hall effect and the magnetoresistive effect. To that end, two sensor elements are used, one operating by the Hall principle and the other by the magnetoresistive principle. Such a combination of sensor elements makes it possible to make full utilization of the advantages of both the Hall principle and the magnetoresistive principle.

BRIEF DESCRIPTION OF THE DRAWING

The objects, features and advantages of the invention will now be illustrated in more detail with the aid of the following description of the preferred embodiments, with reference to the accompanying figures in which:

FIGS. 3a and 3b are respective schematic views of different arrangements of sensor components in a magnetoresistive sensor element that can act as the first sensor element in the arrangement according to the invention; and FIG. 4 is a block diagram of an exemplary evaluation circuit A taken from DE-OS 195 43 652, which can be used in the arrangement according to the invention.

DESCRIPTION OF THE EXEMPLARY EMBODIMENT

Figure 1:
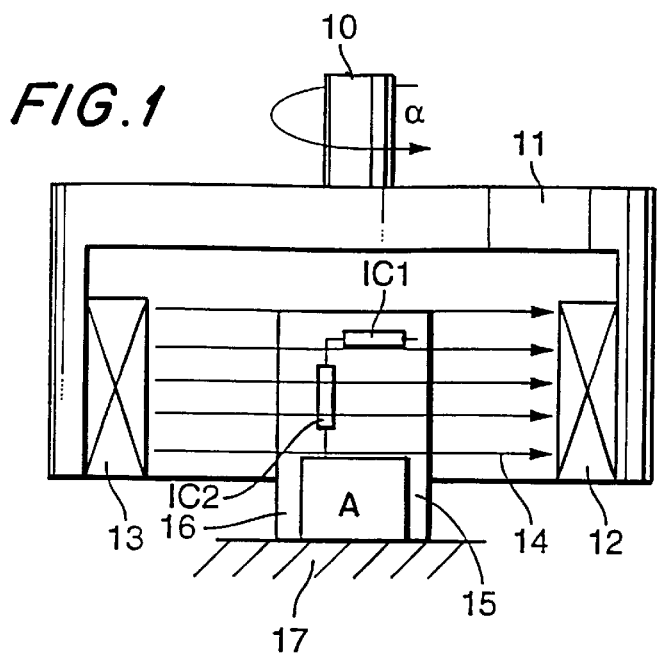
FIG. 1 is a diagram showing the arrangement of the sensor elements in a first embodiment of the arrangement for contactless determination of angular position of a rotatable element, such as a camshaft.

In FIG. 1, an exemplary embodiment of the arrangement according to the invention is shown. The intent is to ascertain the angular position of the rotatable shaft 10, for instance the camshaft of an internal combustion engine. Connected to the shaft 10 is a disk 11, which for instance is cylindrical and which has two magnets 12, 13, or one magnet whose poles are magnetically coupled via the disk, and whose polarity or disposition is such that an approximately homogeneous magnetic field 14 develops between the magnets. This magnetic field rotates with the shaft 10.

The magnetic field sensitive portion of the magnetic field sensor 15 includes the two sensor elements IC1 and IC2, which are located on a substrate 16. The magnetic field sensor 15 is held by means of a sensor mount 17.

The sensor element IC1 includes a sensitive element which operates by utilizing the magnetoresistive effect to ascertain the angle between the magnetic field and the of rotation sensor. Since because of the physical properties fundamental to the magnetoresistive effect the entire angular range of 360° cannot be covered, the sensor element IC1 covers two ranges each of 180°. These ranges are designated as angular range W1 and angular range W2 and will be described in conjunction with FIG. 2a.

The sensor element IC2 contains the evaluation circuit A for the magnetoresistive element IC1 and additionally contains a sensitive unit that operates by the Hall effect. This sensitive unit is used to detect the ranges in which the angle sensor operates, that is, to detect the angular range W1 and the angular range W2. Sensitive units that operate by the Hall effect are described in further detail for instance in DE-OS 195 43 562.

Figure 2A:
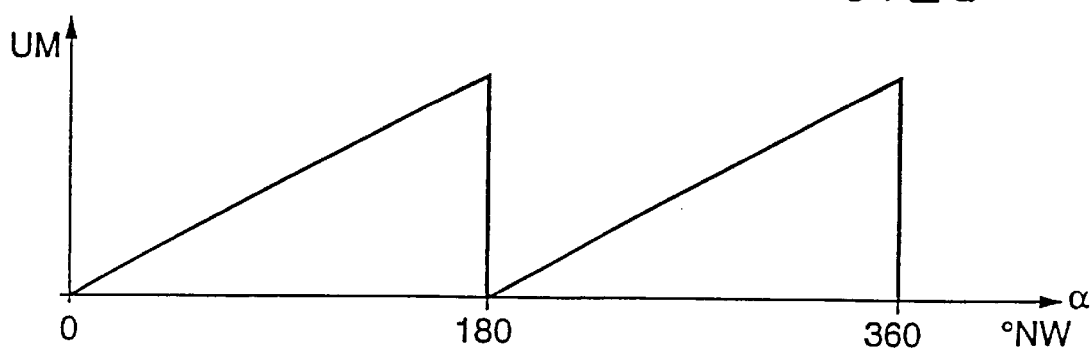
FIGS. 2a, 2b and 2c are graphical illustration of the dependence of the voltages of the output signal of the first sensor element, the output signal of the second sensor element and the sinusoidal voltage applied to the second sensor element respectively on the angle between the magnetic field and the magnetic field sensor.

With the arrangement for contactless determination of an angle of rotation described in FIG. 1, signal courses as shown in FIGS. 2a and b are obtained. The signal course, that is, the output voltage UM of the magnetoresistive element IC1, after processing in the evaluation circuit of FIG. 4, is directly or linearly proportional to the angle $\alpha$ a and rises from 0 to a predetermined value. At an angle of 180°, the signal jumps from the maximum value to 0 and then rises linearly again, up to the angle of 360°.

Figure 2B:
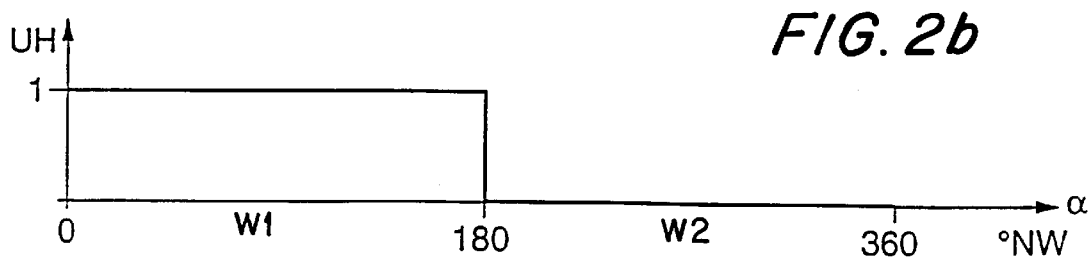
Figure 2C:
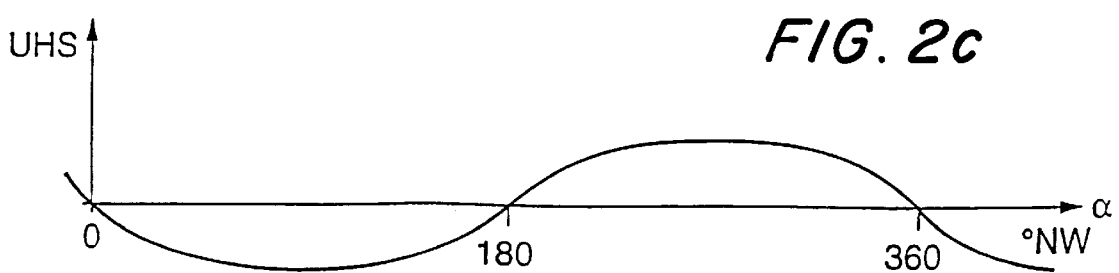

The Hall element IC2, after signal processing, furnishes a digital voltage level UH; in the signal processing, a switchover is made at the zero crossover of the sinusoidal Hall voltage UHS each time as shown in FIG. 2c. The processed signal course of the Hall element is accordingly high between 0 and 180°, and is low between 180° and 360°.

By linking the two signals shown in FIGS. 2a and b, an unambiguous angle determination can be made in an angular range of 360°. The voltage of the signal course of FIG. 2a corresponds to an angle that is between 0° and 180°; 0 V corresponds to 0°, and a maximum voltage is equal to 180°. Because of the properties of the magnetoresistive effect and of the evaluation circuit, this course repeats twice within one complete revolution of the shaft (for instance the camshaft). If the Hall element is designed such that a 1 (the signal is high) is present at its digital output between 0° and 180°, and a 0 (the signal is low) is present at an angle between 180° and 360°, then an unambiguous relationship can be established between the voltage and the angle over the entire range. If the level of the signal course of the Hall element is at zero, then an angle of 180° is added to the angular result of the signal course of the magnetoresistive sensor, in order to obtain the actual absolute angle. For instance, if the signal course of FIG. 2a corresponds to an angle of 57°, and the level of the signal course in FIG. 2b is zero, then the actual angular position is 180°+57°=237°.

In the angular ranges of 0°, 180° and 360°, that is, at each of the switchover boundaries, the outcome of the angle determination is ambiguous. In pure angle measurement, the measured value detection must therefore be suppressed in these regions. If the arrangement for contactless determination of an angle of rotation according to the invention is used in combination with determination of the angle of the camshaft of an engine, then the ambiguity in angle determination at the switchover limit plays a role only during the starting phase of the engine. If the switchover limits of the angle sensor are defined such that they occur at the top dead center points of the engine, then the ambiguity is no longer relevant in practice, since under normal conditions an engine does not stay at top dead center and thus need not start from top dead center, either.

The layout of a magnetoresistive sensor element is shown in FIGS. 3a and 3b, and the associated evaluation circuit is shown in FIG. 4. Since both the sensor element and the evaluation circuit are already known in principle from DE-OS 195 43 562, a more-detailed description will be dispensed with at this point. In principle, the magnetoresistive sensor element comprises two individual components 18,19, rotated by an angle of 45° from one another and coupled to one another via a connection. The two sensor components 18,19 have the appropriate connections and may also be disposed one above the other, as shown in FIG. 3b. The two sensor elements are supplied with the voltages or currents U2, U1 or I2, I1, phase-offset from one another by 90°. After signal processing, the output voltage UM occurs, which is proportional to the magnetization angle or to the angle α to be measured.

The Hall element is not explicitly shown. It is accommodated on the same integrated circuit IC1 as the evaluation circuit. The Hall element can be designed in the simplest possible way, since it need not furnish a linear characteristic curve but merely serves to distinguish the angular ranges and is intended to furnish a digital output signal, in which a 1 characterizes the angular range W1 and a 0 the angular range W2. The simple design and the combination with the evaluation circuit make an economical embodiment possible.

Since magnetoresistive elements detect the magnetic field component in the direction of the chip plane, and the Hall elements detect the magnetic field component perpendicular to the chip plane, the chip of the magnetic resistive element must be perpendicular to the chip of the Hall element. This arrangement is shown in FIG. 1. The chip IC1 with the magnetoresistive element and the chip IC2 with the evaluation circuit and the Hall element or Hall elements can be made separately by different production processes, make effective production possible. Thus after assembly, the term "chip IC2" means the Hall element, represented by a small rectangle in FIG. 1, plus the evaluation circuit A shown below it as a large rectangle. The chips produced separately are connected to one another by conductor pins, which are bent at 90°. This creates an easily manipulated unit for further processing. The separation of the magnetoresistive element and the evaluation circuit and the connection with conductor pins enable optimal integration with the special integrated circuits IC1 and IC2.

What is claimed is:

1. An arrangement for contactless determination of an absolute angular position of a rotatable element between 0° and 360°, said arrangement comprising means for generating a magnetic field comprising at least one magnetic field-producing element arranged to rotate with said rotatable element;

a magnetic field sensor stationary in relation to said rotatable element and arranged to detect said magnetic field, said magnetic field sensor including a first sensor element (IC1) and a second sensor element (IC2), wherein said first sensor element operates according to a magnetoresistive effect so as to generate a first output signal linearly dependent on an angle between said magnetic field and said magnetic field sensor, whereby said first output signal has respective values when said angle is between 0° and 180° that repeat when said angle is between 180° and 360°, said second sensor element operates according to a Hall effect to generate a second output signal which has a high value when said angle is between 0° and 180° and a low value when said angle is between 180° and 360°; and an evaluation circuit (A) comprising means for evaluating said first output signal and said second output signal in order to determine said absolute angular position of said rotatable element between 0° and 360°.

2. The arrangement as defined in claim 1, wherein said first sensor element and said second sensor element are mounted on a sensor mount in a fixed relationship to each other and oriented at an angle of approximately 90° to each other.

3. The arrangement as defined in claim 1, wherein said first sensor element and said second sensor element are arranged so that magnetic field lines of said magnetic field are oriented approximately parallel to said first sensor element and perpendicularly penetrate said second sensor element.

4. The arrangement as defined in claim 1, wherein said rotatable element is a rotatable shaft of an internal combustion engine.

5. The arrangement as defined in claim 4, wherein said rotatable shaft is a camshaft.

6. The arrangement as defined in claim 1, wherein said rotatable element is a camshaft of an internal combustion engine, said camshaft is connected with pistons of said internal combustion engine and said sensor elements are mounted so that said angle is at 0°, 180° and 360° when said pistons are at top dead center points of the internal combustion engine.

7. An arrangement for contactless determination of an absolute angular position of a rotatable element between 0° and 360°, said arrangement comprising means for generating a magnetic field comprising at least one magnetic field-producing element arranged to rotate with said rotatable element;

a magnetic field sensor stationary in relation to said rotatable element and arranged to detect said magnetic field, said magnetic field sensor including a first sensor element (IC1) and a second sensor element (IC2), wherein said first sensor element operates according to a magnetoresistive effect so as to generate a first output signal linearly dependent on an angle between said magnetic field and said magnetic field sensor, whereby said first output signal has respective values when said angle is between 0° and 180° that repeat when said angle is between 180° and 360°, said second sensor element operates according to a Hall effect to generate a second output signal which has a high value when said angle is between 0° and 180° and a low value when said angle is between 180° and 360°; and an evaluation circuit (A) comprising means for evaluating said first output signal and said second output signal in order to determine said absolute angular position of said rotatable element between 0° and 360°, wherein said means for evaluating includes means for determining two angular orientations spaced 180° from each other from only said first output signal of said first sensor element and means for selecting one of said two angular orientations as said absolute angular position of said rotatable element according to said second output signal of said second sensor element.

* * * * *